Patented Nov. 22, 1949

2,489,173

UNITED STATES PATENT OFFICE 2,489,173

PREPARATION OF WHIPPING COMPOSITION AND THE RESULTING PRODUCT

Raymond S. Burnett and James K. Gunther, Decatur, Ind., assignors to Central Soya Company, Inc., Fort Wayne, Ind., a corporation of Indiana No Drawing. Application June 6, 1947, Serial No. 753,056

17 Claims. (Cl. 99—14)

This invention relates to the preparation of a whipping compound. The whipping compound or agent is particularly adapted for use in the preparation of frappé, nougats, fudge, divinity and cream candies, meringue powder, and for a large number of other uses.

An object of the invention is to provide a whipping agent which produces a frappé, etc., of relatively light weight, while at the same time remaining stable over a long period of time. Yet another object is to provide a compound useful for whipping to form a frappé, etc., of relatively light body or weight and which tends to gain little weight over a substantial period of time. Yet another object is to provide a soy protein compound useful as a whipping agent and of superior odor and flavor, while at the same time being free of objectionable color in both the dry state and in solution. A still further object is to provide an improved process for the preparation of soy protein whipping compounds. Other specific objects and advantages will appear as the specification proceeds.

Subjecting soy bean flakes to treatment in an acid water solution as a preliminary step for removing solubles, including what is known as nitrogen free extract, has been regularly employed because nitrogen free extract is found to increase the weight of the frappé unduly when the compound is used in the frappé-forming step. By removing the soluble nitrogen free extract, a final whipping compound is obtained which when incorporated with suitable ingredients for forming a frappé produces a desirable lightweight frappé. The product, however, has the disadvantage in that the frappé is not stable, as indicated by a gain in weight. Over a period of 24 hours, the frappé may gain as much as 90% in weight, thus showing a great lack of stability. The desirable whipping compound is one which produces a lightweight frappé and one which over a period of 24 hours or so gains very little weight, or, in other words, a frappé which is of light weight and which remain stable.

We have discovered that the withdrawal of the solubles in the early treatment of the soy bean flakes, while producing a desirable result in the removal of the nitrogen free extract, produces an undesirable result in that the soluble salts normally contained in the soy bean are also removed. We have found that the soluble salts perform a valuable function in the later stages of the process and prior to the separation of the insolubles from the desired soluble product, in that such salts cause a certain amount of the unhydrolyzed or partially hydrolyzed protein to go into solution. It is not definitely known whether this protein fraction has been slightly hydrolyzed or not, but it will be hereinafter referred to as unhydrolyzed protein. By unhydrolyzed, we wish to include protein which may be slightly hydrolyzed and not completely hydrolyzed. The presence of such soluble unhydrolyzed protein in the final product results in a frappé product which is highly stable. If the salts are not present in the final stages of the process and before the separation of the solubles from the insolubles, such unhydrolyzed or partially hydrolyzed protein tends to remain undissolved and does not appear in the final product.

In our process, we wish to carry on the final separation from the insolubles at a pH of about 3.5, followed by adjusting the filtrate to pH 4.5 prior to drying. When the filtrate is dried and later used, it has a pH approximating the pH of the sugars and syrups used to prepare frappés and therefore there is no tendency for a precipitate to form in such later mixing operation. Without the above salts or the equivalent thereof, we have discoverd that sufficient amounts of the desired soluble unhydrolyzed protein, which has been referred to above as producing the desired stability in the frappé, are not present in the filtrate when the slurry is filtered at pH 3.5. This is probably due to the fact that the unmodified or only slightly modified protein is, like the original soy bean protein, not soluble or only slightly soluble in the pH range of 3.5 to 5.5 unless peptizing salts are present. A pH value of 3.5 has been found to be the optimum point for filtration insofar as the quality of the finished product is concerned with regard to frappé stability. A pH value of 4.5 is desired for the filtrate sent to the dryer because this pH is less favorable for the growth of bacteria in the liquor and results in a finished product that is almost sterile.

We have further discovered that peptizing salts may be substituted for the above-mentioned soluble salts normally present in soy bean material. For example, sodium chloride and sodium phosphate are found unusually satisfactory for this purpose, but it will be understood that other salts producing the desired solubilizing of the unhydrolyzed protein may be employed.

One embodiment of the process may be described as follows: Soy bean flakes may be partially or completely leached in an aqueous solution at a pH of about 4.0 to 5.0. Upon the settling of the fiber and insoluble glycinin and other material, the supernatant liquor is drawn off. The protein in the leached flakes is then modified in an aqueous solution at a pH of about 2.5 and a temperature of about 100° F. for about 20 hours with about 0.35% of 1 to 10,000 strength pepsin, based on the amount of protein in the flakes. After modification, the pH of the flakes slurry is increased to about pH 3.5 with an alkali, such as sodium hydroxide. At the same time, the peptizing salt is added to dissolve the optimum amount of unmodified or unhydrolyzed protein. Usually about 0.2% of the peptizing salt is sufficient to bring about the dissolving of the optimum quantity of unhydrolyzed protein, but it will be understood that considerable variation may be made depending upon the character of the flakes being treated. The added salt not only brings about a dissolving of the unhydrolyzed protein, but keeps it in solution after the filtration or separation step hereafter described and when the pH is raised to about 4.5 prior to drying. After the salt is added, the slurry is filtered or centrifuged to separate the flake residue from the liquor. The liquor now contains the most desirable proportion of hydrolyzed and unhydrolyzed protein, and it is raised to a pH of about 4.5 or to higher pH values with a sodium hydroxide solution or any other suitable alkali. The filtrate which contains about 6.0% solids may be sent directly to the spray drier or other drying means, or may be first concentrated at low temperatures in a vacuum system and then dried.

By the above process, the product can be made substantially free of nitrogen free extract. Preferably, the leaching step, followed by a washing step, is carried through to an extent that the product contains less than 16% of nitrogen free extract. The bulk of the nitrogen free extract can be removed so that the product is made substantially free of the nitrogen free extract. By drawing off the supernatant liquor and rewashing the solids, a product substantially free of nitrogen free extract may be produced. As a result of the removal of a portion of the nitrogen free extract, a lightweight frappé will be prepared from the whipping agent. At the same time, the naturally-occurring salts in the withdrawn leaching water may be replaced or supplemented by the use of common salt or other peptizing salts. If desired, the naturally-occurring salts of the withdrawn material may be recovered and added to the filtrate in a later step of the process. By adding salt in a later step, it is thus possible to balance the proportion of hydrolyzed protein and unhydrolyzed protein so that the finished product contains the principal amount of these components essential for frappé volume and for frappé stability.

The resulting product has a superior odor and flavor and is free of objectionable color in both the dry state and in solution.

A further advantage of the process is that it is unnecessary to heat the liquor to temperatures above 100° F. required for pepsin hydrolysis in order to destroy the pepsin. This is important because it has been found that exposure of the liquor to temperatures above 160° F. severely damages the finished product, with the result that frappés prepared therefrom are smeary and have poor stability. It is possible that high temperatures denature the unmodified protein and destroy the ability of this fraction to impart strength and stability to the frappé structure.

We have described the process above in connection with the modification of protein in leached flakes, but it will be understood that the same principles can be applied to the manufacture of a whipping agent by various modifications of the present process.

As a specific example, wherein the product is obtained by modifying leached flakes, the following may be set out: Five thousand gallons of water were run into a tank and $SO_2$ gas added to the water until a pH value of about 5.0 was obtained. 3,300 pounds of solvent extracted soy bean flakes were then added, with stirring, under the following conditions: One-fourth of the flakes were added simultaneously with $SO_2$ gas so that the pH of the slurry was maintained at about 4.5. The remaining three-fourths of the flakes were then added simultaneously with hydrochloric acid which had been diluted with an equal volume of water, the pH being maintained at approximately pH 4.5. After all the flakes had been added, the pH was reduced to approximately 4.0, and agitation of the slurry was continued for one hour and the flakes allowed to settle for approximately 2½ hours. The supernatant liquor was then decanted to the sewer until 2,500 gallons of slurry, including a small amount of supernatant liquor, remained in the tank. Water was then added to the slurry, with stirring, until the volume was increased to 3,750 gallons. The agitator was then stopped and the flakes again allowed to settle over night or until sufficient supernatant liquor could be decanted off so that 2,750 gallons of leached slurry remained.

The agitator was started and the slurry brought to a temperature of 100° F. with live steam. The pH of the slurry was then reduced to 2.5 by the addition of hydrochloric acid which had been diluted with an equal volume of water. A solution of pepsin was then added which contained 5.2 pounds of 1 to 10,000 strength pepsin. This amount was 0.35% based on the protein in the original flakes, which was approximately 45% of the total weight. This percentage takes into account the loss in non-protein nitrogen which is removed by leaching but which is ordinarily calculated to protein and included with the protein value for the original soy bean flakes.

After the pepsin was added, the slurry was slowly agitated for one hour. From this time on, the slurry was slowly stirred for 10 minutes at 2-hour intervals during a 20-hour modification period. During this period, the temperature was maintained at 100° F.

When 20 hours have elapsed after the addition of the pepsin, 45 pounds of salt (NaCl) are added to the slurry and the pH of the slurry is brought to 3.5 by the addition of 10% sodium hydroxide solution. The slurry is then filtered after 1100 pounds of Celite 545 have been mixed into the slurry and the temperature brought back to 100° F.

The filtrate obtained is neutralized with 10% sodium hydroxide solution to pH 4.5. The solution can then be spray dried as is, or after concentrating to approximately 30% solids in an evaporator at temperatures not in excess of 160° F.

The product produced by the above specific example was made up into a frappé by mixing 2 pounds of the dry product with 4 pounds of water, 80 pounds of corn syrup, and 20 pounds of sugar, and agitating the mixture at high speed. The frappé obtained had an original weight of about 64 ounces per gallon, and after standing for 24 hours, the gain in weight was approximately 10 ounces per gallon. The odor and flavor were excellent and there was no objectionable color in the product.

The influence of the natural salts on the solubility of the unhydrolyzed protein fraction in the soy bean flakes and the effect of the presence of this less soluble fraction on frappé stability is illustrated by the following example:

The product which has the proper balance with regard to the components responsible for both frappé original weight and frappé gain in weight, or stability, is obtained by leaching only part of the soluble sugars, soluble salts, etc., from the flakes prior to modification with pepsin.

It was of interest to prepare two batches of whipping agent as follows:

*Batch #1.*—In this test, the soy bean flakes were repeatedly leached at the isoelectric point of soy bean protein until the flakes were essentially free of materials soluble in water at pH 4.0 to 5.0. These flakes were hydrolyzed with pepsin and carried through to the finished product in the usual manner.

*Batch #2.*—In this test, the soy bean flakes were not leached prior to modification. The analysis of the finished powders and the weight and stability of frappés prepared with them follows:

|  | Fully Leached, #1 | Unleached, #2 |
|---|---|---|
| Moisture_____percent__ | 7.6 | 7.2 |
| Proteinaceous materials (Nitrogen x6.25)___ | 81.6 | 55.8 |
| Ash_____ | 9.8 | 14.1 |
| Nitrogen free extract (by difference)_____ | 1.0 | 22.9 |
| Original frappé weight_____oz./gallon__ | 62 | 84 |
| Frappé gain, 24 hours_____do____ | 54 | 4 |

With sample #1, there was not enough soluble ash in the modified slurry to dissolve sufficient unhydrolyzed protein from the flakes to give a finished product with which a stable frappé could be prepared, and the frappé gain was high. In sample #2, all the natural soluble ash was present and a large amount of unhydrolyzed protein was brought into solution, with the result that an extremely stable frappé was prepared with the dry powder. However, due to the presence of a large amount of non-protein extraneous material, as shown by the nitrogen free extract content of 22.9%, the original weight of the frappé was extremely high.

In the preferred practice, we reduce the leachable solids to a minimum and add sodium chloride to compensate for the large amount of soluble natural ash removed along with the soluble nitrogen free extract. In this way, the nitrogen free extract content is kept low, and the added salt insures the removal of sufficient unhydrolyzed protein from the flakes to obtain a finished product capable of giving a frappé of good stability (low 24-hour weight gain).

While in the foregoing specification, we have set forth certain steps of the process in great detail for the purpose of illustrating an embodiment of the invention, it will be understood that such steps may be varied widely by those skilled in the art without departing from the spirit of our invention.

We claim:

1. In a process for treating soy bean material, the steps of steeping the material in acidified water to remove the bulk of the soluble nitrogen free extract in such material, subjecting the remaining material to enzyme hydrolysis with pepsin, adding a peptizing salt to dissolve a portion of the unhydrolyzed protein, separating the solubles from the insolubles and concentrating the solubles.

2. In a process for treating soy bean material, the steps of steeping the material in acidified water to remove the bulk of the soluble nitrogen free extract in such material, subjecting the remaining material to enzyme hydrolysis with pepsin, adding a peptizing salt to dissolve a portion of the unhydrolyzed protein, separating the solubles from the insolubles at a pH of above 2.5, and concentrating the solubles.

3. In a process for treating soy bean material, the steps of steeping the material in acidified water to remove the bulk of the nitrogen free extract in such material, subjecting the remaining material to enzyme hydrolysis with pepsin, adding a peptizing salt to dissolve a portion of the unhydrolyzed protein, separating the solubles from the insolubles at a pH of about 3.5, and concentrating the solubles.

4. In a process for treating soy bean material, the steps of leaching the material in an acid aqueous solution to remove the bulk of the soluble nitrogen free extract, subjecting the protein portion of the remaining material to hydrolysis with pepsin, to produce hydrolyzed and unhydrolyzed protein, adding a peptizing salt to dissolve a portion of the unhydrolyzed protein, separating the solubles from the insolubles, and concentrating the solubles.

5. In a process for treating soy bean material, the steps of leaching the material in an acid aqueous solution to remove the bulk of the soluble nitrogen free extract, subjecting a protein portion of the remaining material to hydrolysis with pepsin to produce hydrolyzed and unhydrolyzed protein, adding a peptizing salt to dissolve a portion of the unhydrolyzed protein, separating the solubles from the insolubles, and drying the soluble material.

6. In a process for treating soy bean material, the steps of steeping the material in acidified water, withdrawing the water containing solubles to remove the bulk of the soluble nitrogen free extract, subjecting the remaining material to hydrolysis with pepsin to form hydrolyzed and unhydrolyzed protein, adding sodium chloride to dissolve a portion of the unhydrolyzed protein, separating the solubles from the insolubles, and concentrating the solubles.

7. In a process for treating soy bean material, the steps of steeping the material in acid water, withdrawing the water containing solubles to remove the bulk of the soluble nitrogen free extract, subjecting the remaining material to hydrolysis with pepsin to form hydrolyzed and unhydrolyzed protein, adding a sodium phosphate to dissolve a portion of the unhydrolyzed protein, separating the solubles from the insolubles, and concentrating the solubles.

8. In a process for treating soy bean material, the steps of leaching such material in an aqueous solution at a pH of about 4.0–5.0, allowing the insoluble material to settle, drawing off the supernatant liquid, subjecting the insoluble material to enzymic action with pepsin under conditions of hydrogen ion concentration and temperature favorable to the action of the enzyme, adding a peptizing salt to dissolve unhydrolyzed protein, separating the insolubles, and concentrating the soluble material.

9. In a process for treating soy bean material, the steps of leaching such material in an aqueous solution at a pH of about 4.0–5.0, allowing the insoluble material to settle, drawing off the supernatant liquid, introducing water to wash the settled material, withdrawing the wash water, subjecting the insoluble material to the action of pepsin under conditions of hydrogen ion concentration and temperature favorable to the action of pepsin, adding a peptizing salt to dissolve a portion of the unhydrolyzed protein, separating the solubles from the insolubles at a pH above 2.5, and concentrating the solubles.

10. The process of claim 9 in which sodium chloride is employed as the peptizing salt.

11. The process of claim 9 in which a sodium phosphate is employed as the peptizing salt.

12. In a process for treating solvent-extracted soy bean flakes containing fiber, glycinin, and other constituents, the steps of leaching the flakes in an aqueous solution at a pH of about 4.0–5.0, allowing the fiber together with the glycinin and other material to settle, drawing off the supernatant liquid, subjecting the material to the action of pepsin under condtions of hydrogen ion concentration at a temperature favorable to the action of pepsin, adding about 0.2% of sodium chloride, raising the pH to about 3.5, separating the solubles from the insolubles, raising the pH of the filtrate to 4.5, and concentrating the solubles to dryness.

13. A soy bean product, suitable for use as a whipping agent, consisting mainly of hydrolyzed soy protein substantially free of nitrogen free extract and containing a peptizing salt and soluble unhydrolyzed protein.

14. A soy bean product, suitable for use as a whipping agent, consisting mainly of hydrolyzed protein containing less than 16% of nitrogen free extract, and containing also a peptizing salt and soluble unhydrolyzed protein.

15. A composition of matter suitable for use as a whipping agent, comprising soy protein from which the bulk of the nitrogen free extract has been removed, said protein consisting mainly of soluble hydrolyzed protein, together with a lesser proportion of soluble unhydrolyzed protein and a peptizing salt.

16. A composition of matter suitable for use as a whipping agent, comprising soy protein from which the bulk of the nitrogen free extract has been removed, said protein consisting mainly of soluble hydrolyzed protein, together with a lesser proportion of soluble unhydrolyzed protein and sodium chloride.

17. A composition of matter suitable for use as a whipping agent, comprising soy protein from which the bulk of the nitrogen free extract has been removed, said protein consisting mainly of soluble hydrolyzed protein, together with a lesser proportion of soluble unhydrolyzed protein and a sodium phosphate.

RAYMOND S. BURNETT.
JAMES K. GUNTHER.

REFERENCES CITED

The following references are of record in the file of this patent:

UNITED STATES PATENTS

| Number | Name | Date |
|---|---|---|
| 2,323,052 | Cummins | Feb. 18, 1941 |

OTHER REFERENCES

"An Active Whipping Substance from Soybean Flour," Watts and Ulrich, Ind. and Eng. Chem., Oct. 1939, pages 1282 and 1283.

"Protein Extract from Soybeans and Its Use in Food," Journal of Agricultural Research, vol. 57, No. 10, Nov., 1938, pages 737–746.